United States Patent [19]

Peter

[11] Patent Number: 4,589,079

[45] Date of Patent: May 13, 1986

[54] EVALUATION CIRCUIT FOR THE SIGNALS FROM AN ARRAY OF N PHOTOCONDUCTORS WHICH ARE SUCCESSIVELY SCANNED IN A FAST RHYTHM

[75] Inventor: Klaus J. Peter, Isen, Fed. Rep. of Germany

[73] Assignee: FICHT GmbH, Kirchseeon, Fed. Rep. of Germany

[21] Appl. No.: 491,327

[22] PCT Filed: Aug. 6, 1982

[86] PCT No.: PCT/EP82/00166

§ 371 Date: Apr. 14, 1983

§ 102(e) Date: Apr. 14, 1983

[51] Int. Cl.⁴ .......................... G06G 7/48; G06G 7/80
[52] U.S. Cl. ..................... 364/551; 235/411;
250/209; 250/222.2; 324/178; 364/423;
364/516
[58] Field of Search ............. 364/423, 516, 550, 551;
235/411, 412; 250/208, 221, 222.2, 209;
324/178

[56] References Cited

U.S. PATENT DOCUMENTS

| 3,047,723 | 7/1962 | Knapp | 250/222 |
|---|---|---|---|
| 3,376,411 | 4/1968 | Montani et al. | 364/423 X |
| 3,715,601 | 2/1973 | Tucker | 250/222.1 |
| 3,727,069 | 4/1973 | Crittenden, Jr. et al. | 324/178 X |
| 3,852,714 | 12/1974 | Carson | 250/209 X |
| 4,015,122 | 3/1977 | Rubinstein | 250/221 |
| 4,136,568 | 1/1979 | Seymour | 356/141 |
| 4,242,670 | 12/1980 | Smith | 340/568 |
| 4,272,189 | 6/1981 | Bailey et al. | 250/222.1 |
| 4,466,067 | 8/1984 | Fontana | 364/516 X |

FOREIGN PATENT DOCUMENTS

| 2417222 | 9/1979 | France . |
| 1559762 | 1/1980 | United Kingdom . |
| 2065408 | 6/1981 | United Kingdom . |

Primary Examiner—Errol A. Krass
Assistant Examiner—Kevin J. Teska
Attorney, Agent, or Firm—Spencer & Frank

[57] ABSTRACT

Apparatus for evaluating signals generated by first and second spatially separated rows of photoconductors positioned with respect to a measuring plane. The outputs of the photoconductors in each of the rows is scanned by a sampling circuit at a predetermined rate, and the outputs of each sampling circuit coupled to at least one evaluation circuit. Each of the evaluation circuits includes an analog-to-digital converter coupled to the output of the associated sampling circuit, and a pair of digital delay circuits having their inputs alternately coupled to the output of the A/D converter. A comparator is provided for comparing a threshold signal generated by a reference generator with the outputs of the digital delay circuits, the comparator generating a digital signal having a value corresponding to the difference between the ratio of the signals at the outputs of the delay circuits and the threshold signal. A computer coupled to the outputs of the comparators in each of the evaluation circuits determines the coordinates of an object traversing the measuring plane.

13 Claims, 3 Drawing Figures

4,589,079

EVALUATION CIRCUIT FOR THE SIGNALS FROM AN ARRAY OF N PHOTOCONDUCTORS WHICH ARE SUCCESSIVELY SCANNED IN A FAST RHYTHM

BACKGROUND OF THE INVENTION

The invention relates to an evaluation circuit and, in particular, to a device for determining the point of passage of a moving object through a measuring plane.

Such an evaluation circuit can be used, for example, in a device for determining the position of a point on a ballistic curve within a given measuring plane as disclosed in German Offenlegungsschrift No. 2,402,204. In this device, for example according to FIGS. 5 and 6, two cameras are arranged at a known distance from one another and are inclined with respect to one another. The cameras are each provided with a row of photodetectors in their image planes. The signals from the individual detectors are processed in an evaluation circuit (not described in detail in the patent) and are then fed to a computer for determination of the position of the passage of a projectile through the measuring plane.

The detection, for example, of shading of one or a plurality of adjacent detectors in a row as a result of passage of the projectile—it is here assumed that the measuring plane is illuminated—is difficult when the illumination changes.

It is the object of the invention to provide an evaluation circuit which makes the compilation of such detector signals more reliable even under changing external environmental conditions.

In accordance with the invention, apparatus is provided for evaluating signals generated by first and second spatially separated rows of photoconductors positioned with respect to a measuring plane. The outputs of the photoconductors in each of the rows is scanned by a sampling circuit at a predetermined rate, and the outputs of each sampling circuit coupled to at least one evaluation circuit. Each of the evaluation circuits includes an analog-to-digital converter coupled to the output of the associated sampling circuit, and a pair of digital delay circuits having their inputs alternately coupled to the output of the A/D converter. A comparator is provided for comparing a threshold signal generated by a reference generator with the outputs of the digital delay circuits, the comparator generating a digital signal having a value corresponding to the difference between the ratio of the signals at the outputs of the delay circuits and the threshold signal. A computer coupled to the outputs of the comparators in each of the evaluation circuits determines the coordinates of an object traversing the measuring plane.

In accordance with the invention, which evaluates the difference between successively scanned signals from the individual detectors, the reliability with which a momentary event to be evaluated is detected is much greater. A delay of n·T can be effected in the analog region by means of an analog shift register, for example, a so-called bucket chain circuit. Or, the signals can be converted to digital signals which are then stored temporarily. Due to the same signal influence in both channels, it is of advantage for the two signals being compared to also convert the directly used signal and to then reconvert it (D/A conversion).

A further improvement in signal evaluation is realized, according to a further feature of the invention, in that the series of analog signals obtained from the detectors are fed to a peak value sensor and the output signal of this peak value or average value sensor is used as a comparison value to which the signals from the detectors are related (standardization). This relating can be effected directly in the analog/digital converter.

Since the rows of detectors, e.g. so-called diode arrays, preferably include a large number of individual detectors, a further feature of the invention provides that a plurality of, e.g. four, partial evaluation circuits are provided in parallel and their inputs are connected to the individual detectors of detector groups. If four partial evaluation circuits are used, one partial evaluation circuit is connected in succession, for example, with the first, fifth, ninth etc. detector of the row, another partial evaluation circuit is connected in succession with the second, sixth, tenth etc. detector of the row, etc. In that way, it is possible to either lower the sampling frequency or increase the frequency of sampling. The sampling frequency may lie at several MHz. However, it is also possible to associate, for example, the first 256 detectors with the first partial evaluation circuit, the next 256 detectors with the second partial evaluation circuit, etc.

If the number of partial evaluation circuits employed is a, their a simultaneously appearing signals must be converted into consecutively arriving signals. For this purpose, short-term memories having different lengths of storage times are provided in (a−1) partial evaluation circuits so as to be able to line up the signals one after the other within the available clock pulse time. The result is a sequence of signals whose appearance depends on the partial signals (0 or 1).

For the further evaluation of the n signals thus obtained, these signals are fed to a memory having n memory locations. There also is provided a counter which counts from 1 to the highest number of the n memory circuits or of the number of detectors in a row. If a change in light occurs in the measuring plane, e.g. shading by, for example, a projectile, several juxtaposed detectors experience a change in the impinging light intensity. Thus their signals are changed and the evaluation circuit generates different signals (e.g., a 1 each time)—as described above—at the locations associated with these detectors compared to the locations associated with the other detectors. The above mentioned memory circuit in conjunction with the counter now records the counting position of the counter at which this signal change occurs and the position at which it disappears again. Thus, it is determined, for example, that the signal change occurs at counter position b (of n possible counter positions) and that it disappears again at e.g. (b+10). It has now been determined that detectors b through b+10 of the row have noted shading, for example.

If—as mentioned above—a measuring plane is monitored by two cameras each having such a row of detectors and if the above-described evaluation circuits are connected thereto, the results obtained for the two rows of detectors are such that the coordinates of the passage point can be calculated according to known relationships.

DESCRIPTION OF A PREFERRED EMBODIMENT

Figure 1:
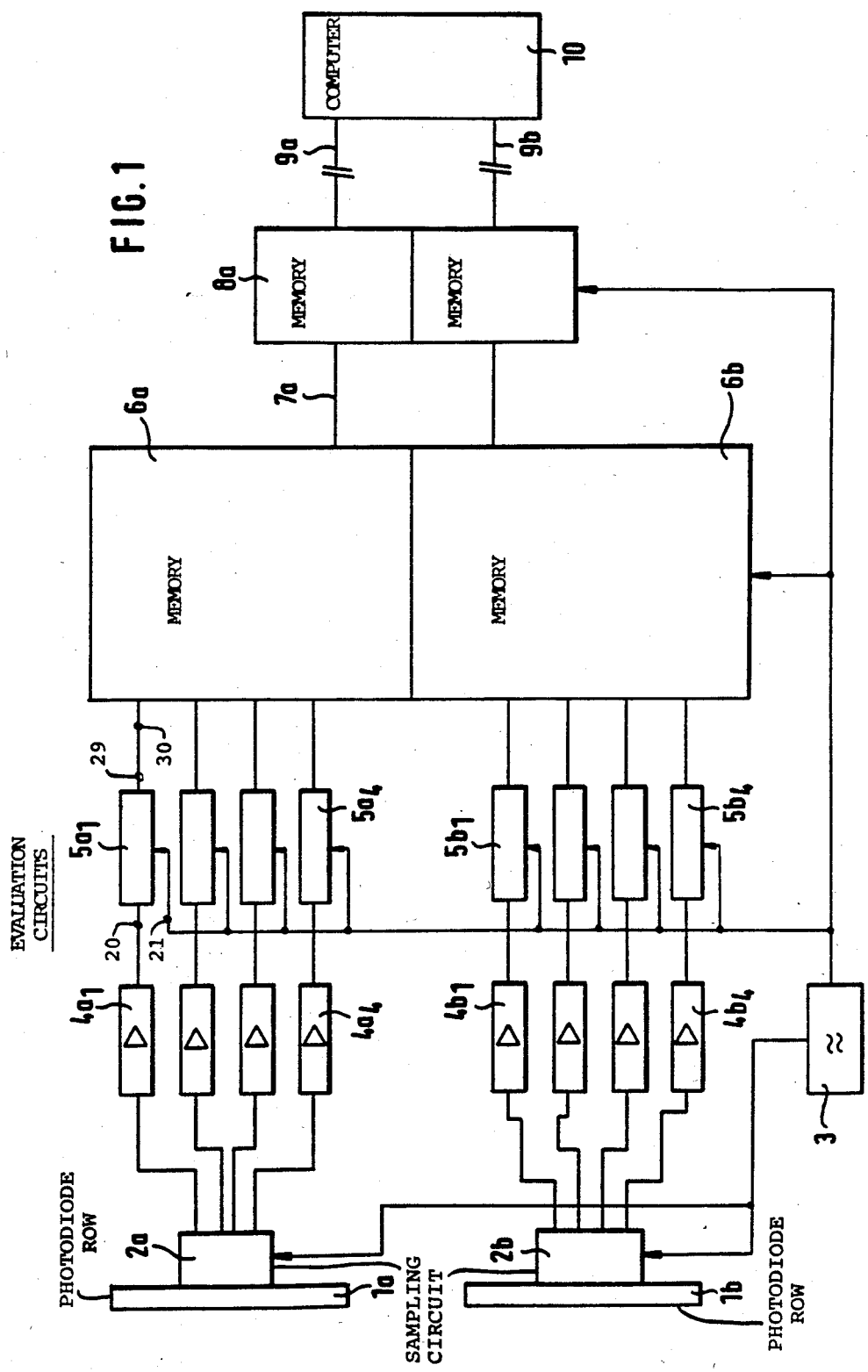
FIG. 1 is a block circuit diagram of a device designed according to the invention for determining the coordinates of a passage point through a measuring plane monitored by two cameras.

In FIG. 1, the numerals 1a and 1b identify two rows of photodiodes, e.g. so-called diode arrays, each including, for example, 1024 individual diodes, associated with two cameras (not shown). These rows of photodiodes are connected to sampling circuits 2a and 2b with which the individual diodes are scanned successively. In order to lower the sampling frequency, which is derived from the frequency of a clock pulse generator 3 (e.g. 16 MHz), sampling circuits 2a and 2b each simultaneously sample four juxtaposed diodes, and their signals are fed separately to amplifiers $4a_1$ to $4a_4$ and $4b_1$ to $4b_4$, respectively. With successive clock pulses, amplifier $4a_1$ is connected, for example, with diodes 1, 5, 9, . . . 1021 and amplifier $4a_2$ is connected with diodes 2, 6, 10, . . . 1022, etc. The sampling frequency need then be only one fourth as much (e.g. 4 MHz).

Amplifiers 4 are followed by partial evaluation circuits $5a_1$ to $5a_4$ and $5b_1$ to $5b_4$. Their structure will be described below in connection with FIG. 2.

Figure 2:
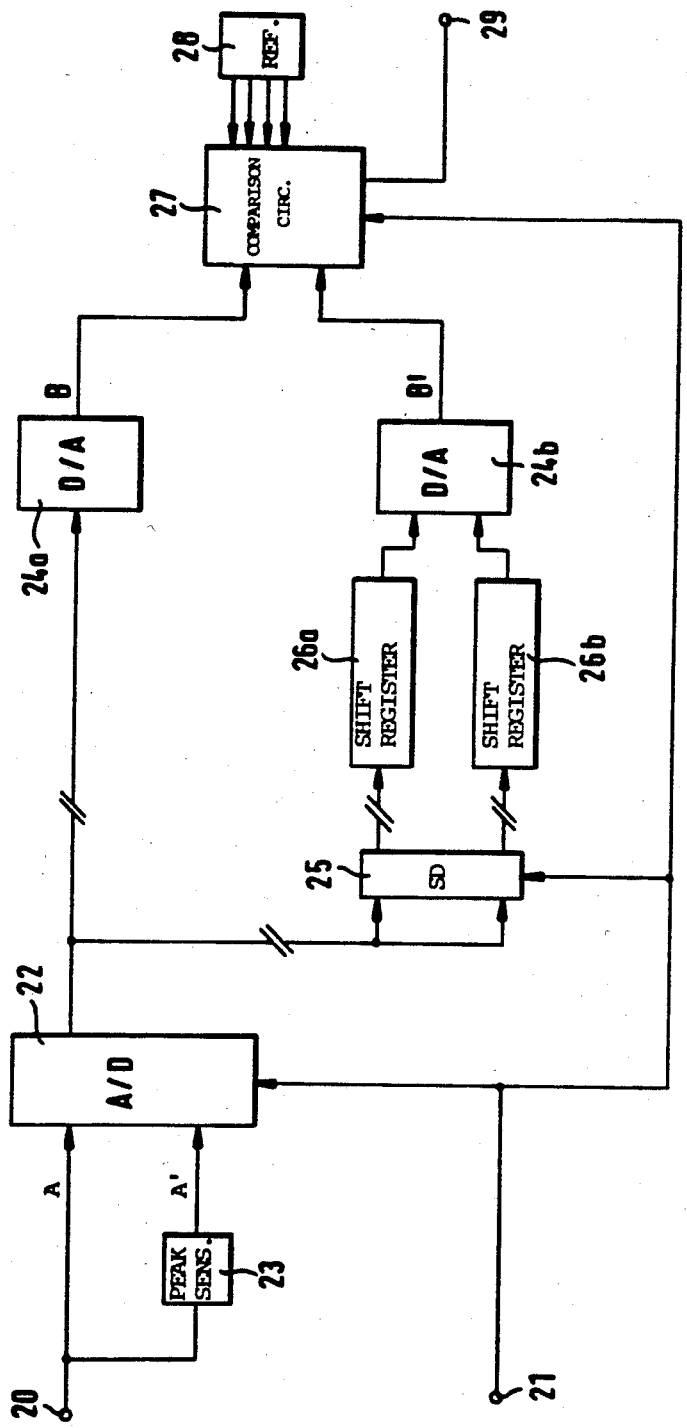
FIG. 2 is an embodiment of the evaluation circuit included in FIG. 1.

FIG. 2 shows the details of one of the evaluation circuits 5. A terminal 20 is connected, for example, with amplifier $4a_1$, and terminal 21 is connected with generator 3. Thus the analog signals A from the sampled diodes are supplied in succession to terminal 20. The individual diodes themselves already generate considerably different signal amplitudes from the same light influence. Changes in the illumination and aging phenomena in the diodes also change the output signals. Nevertheless, a change in intensity produced, for example, by shading, must be recognized as such and evaluated at each individual diode. The circuit of FIG. 2 is provided for this purpose.

The analog signals A at terminal 20 are fed to an analog/digital converter 22. This module 22 includes a quotient former. For this purpose, the converter module 22 additionally receives the signal from a peak value sensor 23 which feeds a signal A' corresponding to the peak value of successive analog signals to module 22. There, the quotient A/A' is formed in order to suppress changes in brightness and then the resulting value is digitalized.

The output signal from converter 22 is reconverted to an analog signal in digital/analog converter 24a and is fed simultaneously, via a switching device 25, to one of digital memories 26a and 26b comprising 1024/4=256 memory locations. Memories 26a and 26b are delay circuits consisting of digital shift registers.

Switching device 25 causes the 256 digital signals to enter into, for example, shift register 26a during a sampling cycle of the diode array, shift register 26a simultaneously feeding its previous contents to a digital/analog converter 24b. In the next following diode sampling cycle, switching device 25 then feeds the output signals of converter 22 to shift register 266 whose previous contents are transferred to digital/analog converter 24b. In this way it is accomplished that at the outputs of converters 24a and 24b there are present analog signals B and B' which were derived from the same diodes but were obtained there at two points in time offset by twice the sampling cycle (2 T). The selection of 2 T was made to assure that a signal obtained in one sampling cycle and to be evaluated is compared with a (previous) signal state during which no signal to be evaluated appeared. If, for example, shading has only a brief effect in one cycle (e.g. only during 30% thereof), the signal may possibly not be sufficient to exceed the threshold. During the next sampling cycle the period of dwell is then assumed to be sufficient. If the previous signal were used as a reference (comparison) the threshold would again not be exceeded. However, by referring to the signal that appeared 2 T earlier, the threshold is exceeded. After detection of the event, evaluation is blocked for a period of time.

Comparison circuit 27, which functions as a comparator, now forms the quotient of output signals B and B'; then, this quotient is compared with a threshold which may be set via a device 28 and, depending on whether the threshold was exceeded or not, a 1 or a 0 signal is generated which is available at terminal 29. A sequence of 256 signals are obtained at terminal 29 during one sampling cycle T of which each signal is a 1 or a 0.

The detectors must have a certain amount of memory retention to assure that a change can be detected. This memory retention must be dimensioned in such a manner that a change can still be detected if the sampling of one diode takes place offset by almost T with respect to the occurrence of the event.

Figure 3:
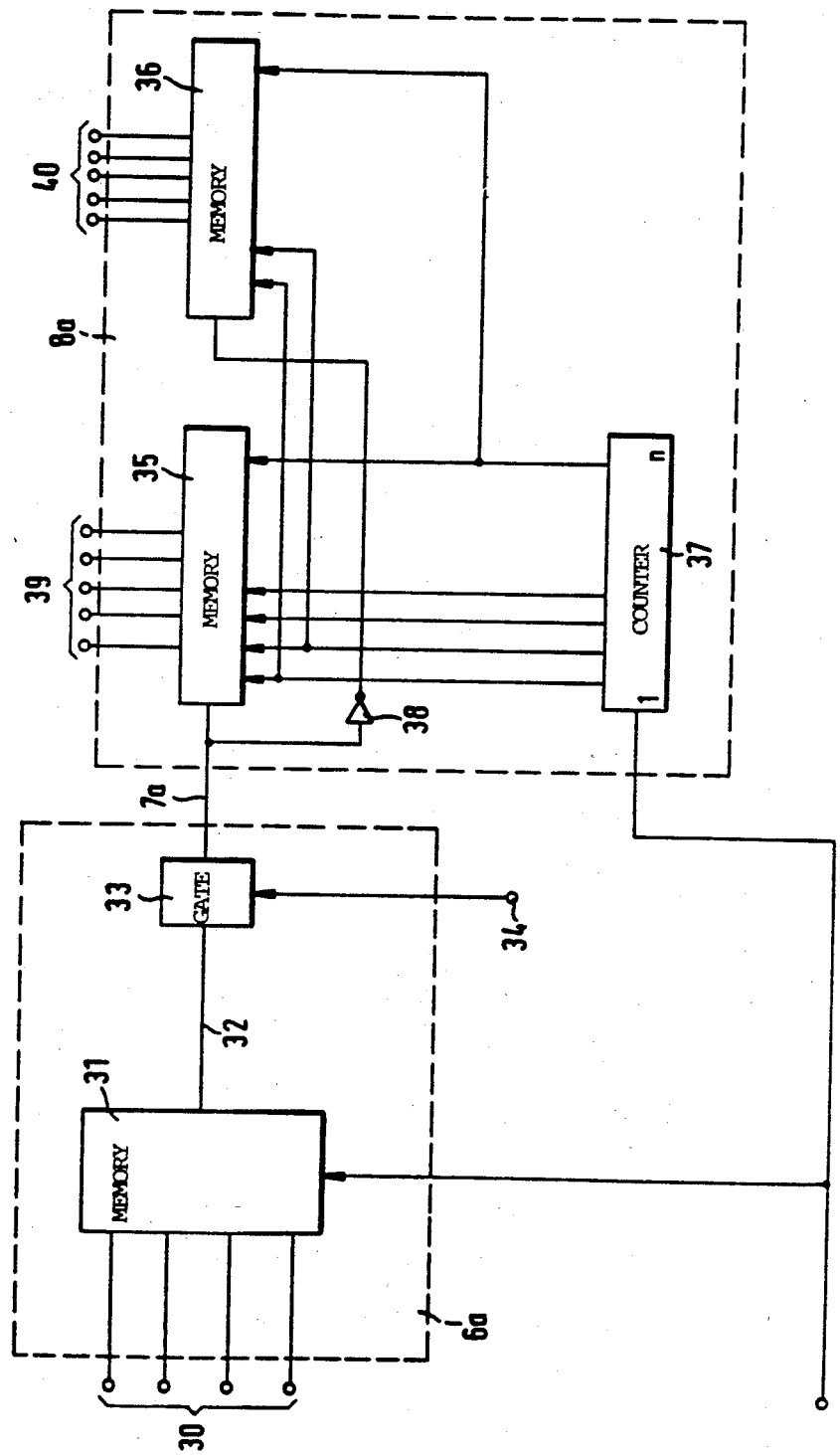
FIG. 3 is an embodiment of other blocks of FIG. 1.

Output terminal 29 of the evaluation circuit $5a_1$ and correspondingly also the output terminals of the other partial evaluation circuits are connected with a first signal storage block 6a (FIG. 1), in which successively appearing signals are generated from the four parallel occurring signals from circuits $5a_1$ to $5a_4$. This will be explained in connection with FIG. 3 in which the four input terminals of block 6a are marked with the numeral 30. The signals are separately fed into memory 31 and are called out at time intervals of ¼ of the clock pulse time $\Delta T$ (e.g. $\Delta T=\frac{1}{4}.\frac{1}{4}$ MHz). In this way, a signal sequence is produced in output line 32 at the clock pulse frequency of 16 MHz with consecutive signals—in the correct sequence—being derived from the output signals of adjacent diodes.

Block 6a may also include a gate 33 which, by actuation at terminal 34, suppresses the signal in line 32, for example if in block 6b no change in signal occurs in the signal sequence at the same time, i.e. the second camera did not record a corresponding event.

The output of block 6a is connected via a line 7a with a further block 8a in which the signal changes are associated with the diodes of the row. According to FIG. 3, this block 8a includes two memory devices 35 and 36 as well as a counter 37, which counts each time (at a clock pulse frequency of 16 MHz) from 1 to n (1024) and begins at counter position 1 with the beginning of sampling of the first diode of the array. If, for example a "1" appears for the first time during one cycle T at the output of gate 33 or in line 7a, respectively,—let it be assumed that, for example, shading produces such a signal in the shaded diodes—then the momentarily existing counter position $Z_{min}$ of counter 37 is retained in memory 35 (e.g., $Z_{min}=510$). If this "1" signal ends after a few clock pulses, e.g. at counter position 520, this second position $Z_{max}$ is retained in the memory due to inversion in inverter 38. This result indicates that shading was detected from the 510th to the 520th diode. These counter positions $Z_{min}$ and $Z_{max}$ are available as digital values at terminals 39 and 40.

The digital values are fed—as shown in FIG. 1—via line bundle 9a and correspondingly for the other camera via line bundle 9b to a computer 10 which is able to calculate according to known relationships the penetration point in the measuring plane from the known distance of the cameras and their known angles of inclination as well as from the measuring values $Z_{min}$ and $Z_{max}$ and the corresponding values from the other channel (line bundle 9b).

I claim:

1. In a device for determining the point of passage of a moving object through a measuring plane, the device including (1) two mutually inclined cameras arranged at a distance from one another, each being provided with a row of n photodetectors which are scanned successively in a fast rhythm to provide sampled signals from each row of photodetectors; (2) an evaluation circuit including two portions to which are fed the sampled signals from a respective row of photodetectors, each portion of the evaluation circuit including a delay device for delaying the signals derived from the n photodetectors of the respective row as well as a comparison circuit which compares output signals derived from the same photodetectors but offset in time and emits a 0 or 1 signal depending on the difference between the signals; and (3) a computer which receives the output signals from the comparison circuit of both portions of the evaluation circuit for determining the coordinates of the point of passage, the improvement wherein: each portion of the evaluation circuit includes at its input an analog/digital converter; the delay devices comprise digital double memories in which are stored those signals which are derived from the signals of the respective photodetector rows during the last two sampling cycles; and the comparison circuits receive the signal just derived from a photodetector and the corresponding signal derived two sampling cycles earlier, said comparison circuits forming the quotients of these signals and comparing them with a threshold value.

2. A device as defined in claim 1, wherein each portion of the evaluation circuit includes two digital-/analog converters for reconverting the signals fed to the respective comparison circuit.

3. A device as defined in claim 2, wherein there is provided in each portion of the evaluation circuit a peak value sensor which receives the analog signals of the photodetectors and whose output signal is fed to the analog/digital converter as a comparison value for the purpose of standardization.

4. A device as defined in claim 1, wherein each portion of the evaluation circuit comprises a plurality of partial evaluation circuits, each partial evaluation circuit being operatively connected to a respective group of photodetectors in the respective row thereof and including an analog/digital converter at its input, a delay device having digital double memories in which are stored those signals which are derived from the signals of the respective group of photodetectors during the last two sampling cycles, and a comparison circuit to receive the signal just derived from a photodetector and the corresponding signal derived two sampling cycles earlier, said comparison circuit forming the quotient of these signals and comparing the quotient with a threshold value.

5. A device as defined in claim 4, wherein the outputs of the plurality of partial evaluation circuits are each connected to short-term memory means for temporarily storing the signals from said partial evaluation circuits and for forming a signal sequence from the plurality of stored signals, the appearance of said signal sequence depending on the presence of 1 or 0 signals.

6. A device as defined in claim 1, wherein said evaluation circuit has connected to it a memory circuit and said memory circuit has an associated counter which counts in synchronism with the sampling of 1 up to a maximum number of n detectors of the row and is connected with the memory circuit in such a manner that in a first memory there is retained the counter position whose associated detector is the first to indicate a signal change as a result of a sensed event in the measuring plane and in a second memory there is retained the counter position whose associated detector was the last to indicate the signal change as a result of a sensed event, said counting positions being provided to at least one of a computer and a display device.

7. Apparatus for evaluation of signals generated by first and second spatially separated rows of photoconductors positioned with respect to a measuring plane, said apparatus comprising:
a pair of sampling circuits, each of which scans the outputs of the photoconductors in a respective row at a predetermined rate;
a plurality of evaluation circuits, at least one evaluation circuit being associated with each of said sampling circuits, each evaluation circuit including
an analog-to-digital converter having an input coupled to an output of said associated sampling circuit,
first and second digital delay circuits having their inputs alternately coupled to the output of said analog-to-digital converter, said delay circuits delaying the signals generated by said photoconductors for two sampling cycles,
a reference generator for generating a threshold signal, and
a comparison circuit having a first input coupled to the output of said analog-to-digital converter, a second input coupled to the outputs of said first and second digital delay circuits and a third input coupled to the output of said reference generator, said comparison circuit generating a digital signal having a value corresponding to the difference between the ratio of the signals at its first and second inputs to the threshold signal at its third input; and
a computer coupled to the outputs of the comparison circuits in each of said evaluation circuits, said computer determining the coordinates of an object traversing said measuring plane.

8. Apparatus as defined in claim 7, wherein each evaluation circuit further comprises a first digital-to-analog converter interposed between said analog-to-digital converter and the first input of said comparison circuit and a second digital-to-analog converter interposed between the output of said first and second digital delay circuits and the second input of said comparison circuit.

9. Apparatus as defined in claim 7, wherein each evaluation circuit further comprises a peak value sensor having its input coupled to the output of said sampling circuit and its output coupled to an input of said analog-to-digital converter.

10. Apparatus as defined in claim 7 wherein the number of photoconductors in each of said rows is n, and the number of evaluation circuits associated with each row of diodes is a, wherein a is greater than one and less than n.

11. Apparatus as defined in claim 7 which further comprises a clock pulse generator coupled to said sampling and evaluation circuits for timing the operation thereof, and wherein a first signal storage means is interposed between the evaluation circuits associated with each sampling circuit and said computer, said first signal storage means including a short-term memory coupled to said clock pulse generator for storing the digital signals at the outputs of said comparison circuits and outputting said signals at the clock pulse rate.

12. Apparatus as defined in claim 11 wherein a second signal storage means is interposed between said first signal storage means and said computer, said second signal storage means including first and second memory devices coupled to the output of said short-term memory, and a counter coupled to said clock pulse generator and said first and second memory devices, said counter counting in synchronism with the sampling of the photodetectors in each of said rows, said first memory device storing the counter position of the associated detector which first indicates a signal change resulting from an object traversing said measuring plane and said second memory device storing the counter position of the associated detector which was the last to indicate a signal change resulting from said object traversing said measuring plane.

13. Apparatus as defined in claim 12 wherein a gate is interposed between said short-term memory and said first and second memory devices, said gate preventing said first and second memory devices from receiving the output of said short-term memory when only one of said first and second rows of photoconductors has detected an object traversing said measuring plane.

* * * * *